US007944468B2

(12) United States Patent
Hoffman et al.

(10) Patent No.: US 7,944,468 B2
(45) Date of Patent: May 17, 2011

(54) AUTOMATED ASYMMETRIC THREAT DETECTION USING BACKWARD TRACKING AND BEHAVIORAL ANALYSIS

(75) Inventors: Richard L. Hoffman, Rancho Palos Verdes, CA (US); Joseph A. Taylor, Long Beach, CA (US)

(73) Assignee: Northrop Grumman Systems Corporation, Redondo Beach, CA (US)

( * ) Notice: Subject to any disclaimer, the term of this patent is extended or adjusted under 35 U.S.C. 154(b) by 1626 days.

(21) Appl. No.: 11/174,777

(22) Filed: Jul. 5, 2005

(65) Prior Publication Data

US 2007/0011722 A1 Jan. 11, 2007

(51) Int. Cl.
*H04N 7/18* (2006.01)

(52) U.S. Cl. ........................................................ 348/143

(58) Field of Classification Search ................... 348/143
See application file for complete search history.

(56) References Cited

U.S. PATENT DOCUMENTS

| | | | | |
|---|---|---|---|---|
| 5,666,157 | A | 9/1997 | Aviv | |
| 5,825,283 | A * | 10/1998 | Camhi | 340/438 |
| 6,408,304 | B1 * | 6/2002 | Kumhyr | 707/102 |
| 7,386,151 | B1 * | 6/2008 | Moritz | 382/116 |
| 2001/0027388 | A1 | 10/2001 | Beverina et al. | |
| 2002/0196147 | A1 | 12/2002 | Lau | |
| 2003/0107650 | A1 | 6/2003 | Colmenarez et al. | |
| 2004/0061781 | A1 | 4/2004 | Fennell et al. | |
| 2004/0131254 | A1 | 7/2004 | Liang et al. | |
| 2004/0161133 | A1 | 8/2004 | Elazar et al. | |
| 2004/0199785 | A1 * | 10/2004 | Pederson | 713/200 |
| 2004/0240542 | A1 | 12/2004 | Yeredor et al. | |
| 2005/0002561 | A1 | 1/2005 | Monachino et al. | |
| 2005/0043961 | A1 | 2/2005 | Torres et al. | |
| 2005/0073585 | A1 | 4/2005 | Ettinger et al. | |
| 2005/0096944 | A1 * | 5/2005 | Ryan | 705/4 |
| 2005/0162515 | A1 * | 7/2005 | Venetianer et al. | 348/143 |

FOREIGN PATENT DOCUMENTS

WO WO 2005029264 A2 3/2005

OTHER PUBLICATIONS

Sheth et al., "Semantic Association Identifiaction and Knowledge Discovery for National Security Applications", Technical Memorandum #03-009, LSDIS Lab, University of Gorgia, 2003.*
Homeland Security, "Homeland Security Presidential Directive 3", 2002.* Steve Irsay, Surveillance Cameras Play Increasing Role as Investigation Tool, http://archives.cnn.com/2002/LAW/10/21/ctv.cameras/, 3 pages (Oct. 21, 2002).
Jack Levin, Keeping an Eye and a Camera on College Students, The Boston Globe, www.violence.neu.edu/Keep%20Camera.htm, 2 pages (Feb. 5, 2005).
3DV website, http://www.3dvsystems.com/solutions/markets.html, 6 pages (Not Dated).

* cited by examiner

*Primary Examiner* — Andy S. Rao
*Assistant Examiner* — Hee-Yong Kim
(74) *Attorney, Agent, or Firm* — Stetina Brunda Garred & Brucker

(57) ABSTRACT

A method and system of predictive threat detection is provided which utilizes data collected via a ubiquitous sensor network spread over a plurality of sites in an urban environment. The method includes the steps of: triggering an inquiry regarding a suspect entity at a current site in response to commission of a triggering action by the suspect entity; in response to the inquiry, compiling the data corresponding to the sites at which the suspect entity was detected by the sensor network; and analyzing the data to determine a threat status regarding the suspect entity.

12 Claims, 6 Drawing Sheets

AUTOMATED ASYMMETRIC THREAT DETECTION USING BACKWARD TRACKING AND BEHAVIORAL ANALYSIS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention generally relates to surveillance systems, and more particularly to a predictive threat detection system that is operative to reanalyze and reinterpret historic image and video data obtained through a sensor network automatically based on current findings.

Effective security against crime and terrorism is a passionate pursuit for nearly all nations. Indeed, the use of surveillance to increase security has becoming increasingly popular for private parties, government agencies, and businesses. It is extremely common in today's society for an individual to look up and realize that she is under the watchful lens of at least one camera while visiting a business establishment or entering a government building. The technology behind this surveillance has exploded in recent years, facilitating a proportionate increase in the use of security surveillance equipment in new locations, and with new purposes in mind.

Security surveillance, although used by various persons and agencies, shares a common goal: to detect potential threats and to protect against these threats. At present, it is not clear that this goal has been achieved with current technology. Indeed, progress toward this goal has been made in moderate steps. An initial step toward this goal was the implementation of surveillance in the form of security guards, i.e. human surveillance. Human surveillance has been used for years to protect life and property; however, it has inherent spacial and temporal limitations. For example, a security guard can only perceive a limited amount of the actual events as they take place, a security guard has limited memory, and often, a security guard does not understand the interrelationship of events, people, or instrumentalities when a threat is present. Thus, a criminal or adversarial force blending into a group may be undetected.

In order to address some of the limitations of human surveillance, electronic surveillance was developed and implemented. In the early 1960's, surveillance technology evolved to include the use of video cameras. See CNN Archive, available at http://archives.cnn.com/2002/LAW/10/21/ctv.cameras/. Early camera systems did not see much success until the advent and promulgation of digital technology in the 1990's, which increased system capacity in memory, speed, and video resolution. See id. Currently, this surveillance allows an individual to view events as they take place (a forward in time, or "forward-time-based" approach) and to record these events for later review. For example, the individual (often a security guard) could monitor multiple closed-circuit cameras for several locations and when necessary, provide physical security enforcement for a given location. Such a system may also be monitored remotely by individual business owners or homeowners over the internet. As may be expected, these systems may vary in complexity—sometimes having multiple cameras and monitoring sensors—depending on the size and importance of the protected area.

As electronic surveillance technology has improved, its use has become more ubiquitous. Governments have begun implementing this technology in large scale to better protect their citizens. For example, England has become known as a world leader in electronic surveillance due to its extraordinary surveillance system. According to the Electronic Privacy Information Center, England has installed over 1.5 million surveillance cameras, which results in the average Londoner being video taped more than 300 times per day. See id. In fact, here in the United States, major cities such as Boston, Chicago, and Baltimore have plans to implement electronic surveillance in order to curtail crime, traffic problems, and adversarial acts. See Jack Levin, *Keeping An Eye And A Camera On College Students*, The Boston Globe, Feb. 5, 2005, at A11. Indeed, in addition to the reality that electronic surveillance is now here to stay, it is also clear that it will only become more effective in combating crime and terrorism.

Presently, many of the electronic surveillance systems are developing independence from human interaction to monitor and analyze the video data presented on the monitors. Although electronic surveillance is becoming ubiquitous, its reliance on human judgment is problematic due to the limitations and cost of human resources. The developing independence of electronic surveillance seeks to address these shortcomings. In fact, surveillance methods and technologies are being developed that utilize visual tracking and image processing software that do not require human judgment. For example, available technology such as identification and face recognition sensors are capable of measuring the depth and dimensions of faces and places. This technology may be used to identify an ATM user, provide access to an authorized person in restricted areas (and set off an alarm for unauthorized persons), and to monitor three-dimensional rooms, places, and movements of various people and vehicles. See e.g. 3DV Website, available at http://www.3dvsystems.com/solutions/markets.html.

However, similar to the systems previously discussed, these electronic surveillance systems share the inadequacy of human surveillance: they utilize a forward-time-based approach and only archive real-time data for user inspection after the fact. In situations where adversaries operate in an urban environment, by dressing as civilians, driving civilian vehicles, and behaving like civilians, adversaries are able to move about with impunity because even state-of-the-art monitoring and surveillance systems will not detect anything suspicious. When they strike, it is usually a surprise. Worse, when they strike it is already too late to piece together how they set up the attack because there may be no record of the events that lead to the attack, or there is piecemeal information that takes a long time to put together into a cohesive narrative.

While deploying dense sensor networks in an urban environment has become feasible, processing all of the sensor data and tracking all objects in real-time may not be. Predicting the subset of data that will be relevant in the future has proved to be exceedingly difficult, yet without a record of recent events and entity tracking, the utility of these sensor networks is severely limited. Therefore, instead of preventing maleficence, these forward-time-based networks may at best serve to aid a subsequent investigation as to the identification and cause of the maleficence.

Thus, there appear to be several drawbacks to this forward-time-based approach, including: (a) adversaries can disguise themselves to appear and act neutral until they decide to mount an attack, which allows them to utilize the element of surprise and increase their proximity to their objective with little resistance; and (b) even if there are behavioral or physical cues that provide some early warning about the threat, any possibility of discovering where the threat originated is difficult to reconstruct and even possibly lost. The inadequacies of the forward-time-based approach, common to both human and electronic surveillance, has been exposed even more recently through the plainclothes warfare and adversarial attacks seen in recent events.

In particular, forward-time-based surveillance appears to be incapable of preventing deceptive adversarial attacks. Traditional threat assessment in military warfare was a relatively simple task for a soldier with proper training. However, the current trend in military warfare toward terrorism, which is rooted in deception, uses an urban environment to camouflage and execute adversarial operations. Thus, even if real-time recognition of clothing, faces, types of munitions, or a suspicious approaching vehicle were to provide a warning to friendly forces (using a forward-time-based approach), the warning is often too late to prevent an attack. Indeed, although society may sometimes thwart deceptive adversarial attacks through forward-time-based threat assessment, this method is inadequate. Present experience teaches that adversarial forces take advantage of this forward-time-based approach in order to carry out their attacks.

Therefore, there is a need in the art for a threat detection system that is predictive and preventative. There is a need in the art for a threat detection system that is capable of processing and archiving images, video, and other data through a sensor network, and that may analyze this archived data based on current findings. There is a need in the art for a threat detection system that utilizes a short-term memory bank of sensor data to selectively track entities backwards in time, especially one that selectively reserves the use of more effective, but more expensive data processing methods until their use is warranted. Further, there is a need in the art for a threat detection system that is operative to acquire useful information about an adversary, such as home base location, compatriots, and what common strategies and patterns of attack they use. Finally, there is a need in the art for an automated predictive threat detection system that is operative to reanalyze and reinterpret archived and historical data in response to current important events, and to provide a suitable analysis of the discovery and the threat that the discovery poses.

BRIEF SUMMARY

A time machine would make a very potent military tool, particularly in urban environments where visibility is often severely limited by surrounding structures and consequences of behavior are not understood until after the fact. Even if travel into the past were limited to hours or days and the past could not be changed but only observed, the information content alone would be invaluable. For example, that innocent-looking passenger car approaching a security gate would not look so innocent if it were possible to go in the past and observe that it came from a neighborhood strongly suspected of harboring insurgents. As another example, that shipping depot would be very suspicious if it could be observed that all the cars involved in recent car bombings stopped at that depot shortly before the bombing.

Time machines in the common understanding of the term are not yet (and may never be) technically possible. However, given sufficient sensor networks, data storage, image analysis, and spatial/temporal reasoning technologies, all integrated into an appropriate information extraction framework, the above information-gathering capabilities can be implemented today.

In accordance with an embodiment of the present invention, a method of predictive threat detection is provided. The method utilizes data collected via a ubiquitous sensor network spread over a plurality of sites in an urban environment, and the sites are classified according to site threat level. The ability to view past events is made possible due to the sensor data that is accumulated over time from multiple sensors distributed in the sensor network over the urban environment. The oldest data may be continually refreshed by new sensor data, and the span of time between the oldest data and new data indicates how far in the past the detection can be done.

The method comprises the steps of: (a) triggering an inquiry regarding a suspect entity at a current site in response to commission of a triggering action by the suspect entity; (b) backtracking the suspect entity in response to the inquiry by collecting the data from each site at which the suspect entity was detected by the sensor network; (c) compiling a data set including a list of the sites at which the suspect entity was detected and the data corresponding thereto; and (d) comparing the list of sites included within the data set to the corresponding site threat level to determine a threat status regarding the suspect entity.

The method may further include the steps of: (a) analyzing the data within the data set of the suspect entity to determine whether an interaction took place between the suspect entity and a subsequent entity; and (b) upon determining that the interaction took place, automatically repeating the backtracking, compiling, and comparing steps for the subsequent entity to determine a threat status regarding the subsequent entity.

For each subsequent entity, the method may further include repeating the steps of: (a) analyzing the data within the data set of the subsequent entity to determine whether an interaction took place between the subsequent entity and an additional subsequent entity; and (b) upon determining that the interaction took place, automatically repeating the backtracking, compiling, and comparing steps for the additional subsequent entity to determine a threat status regarding the additional subsequent entity.

In addition, the method may further include the step of: reevaluating the threat status of at least one entity in response to at least one of: the threat status of the additional subsequent entity and the data set for the additional subsequent entity.

In accordance with another implementation of the present invention, the interaction may include at least one of: a physical transfer, a mental transfer, and a physical movement. In this regard, the method may further include the steps of: (a) reanalyzing the data corresponding to the interaction to determine additional information regarding at least one of: the physical transfer, the mental transfer, and the physical movement; and (b) reevaluating the threat status of at least one entity based on the additional information.

According to another aspect of the present invention, upon collection of the data by the sensor network, the data may initially be processed utilizing at least one of: background subtraction and temporal differencing, resolving between multiple overlapping objects, classification of objects, tracking of objects, analysis of objects, and pattern matching. Further, the processed data may be used to derive one or more of: an image, a movie, an object, a trace, an act, and an episode.

In accordance with a further aspect of the present invention, additional system resources may be allocated to process the data in response to the inquiry regarding the suspect entity.

According to another embodiment of the present invention, a method of predictive threat detection is provided which utilizes data collected via a ubiquitous sensor network spread over a plurality of sites in an urban environment. The method comprises the steps of: (a) triggering an inquiry regarding a suspect entity at a current site in response to commission of a triggering action by the suspect entity; (b) in response to the inquiry, compiling the data corresponding to the sites at which the suspect entity was detected by the sensor network; and (c) analyzing the data to determine a threat status regarding the suspect entity.

The method may further include the steps of: (a) analyzing the data to determine whether an interaction took place between the suspect entity and a subsequent entity; and (b) upon determining that the interaction took place, automatically repeating the compiling and analyzing steps for the subsequent entity to determine a threat status regarding the subsequent entity. In addition, the method may further include the step of: reevaluating the threat status of the suspect entity in response to at least one of: the threat status of the subsequent entity and the data set for the subsequent entity.

In accordance with another implementation of the present invention, for each subsequent entity, the method may further include repeating the steps of: (a) analyzing the data of the subsequent entity to determine whether an interaction took place between the subsequent entity and an additional subsequent entity; and (b) upon determining that the interaction took place, automatically repeating the compiling and analyzing steps for the additional subsequent entity to determine a threat status regarding the additional subsequent entity. Further, the method may further including the step of: reevaluating the threat status of at least one entity in response to at least one of: the threat status of the additional subsequent entity and the data set for the additional subsequent entity.

In a further implementation of the present invention, the analyzing step may further include: identifying a behavior pattern of the entity based on the data. In this regard, the threat status of the entity is reassessed based on the behavior pattern.

According to yet another implementation, the method may further include the step of: updating the site threat level of each of the respective sites at which the suspect entity was detected corresponding to the threat level of the suspect entity.

In accordance with another embodiment of the present invention, a system for automated threat detection in an urban environment is provided. The system utilizes data collected via a sensor network which is spread over a plurality of sites in the urban environment. The system comprises: (a) a threat monitor being operative to detect a suspect entity in response to a triggering action by the suspect entity utilizing a live feed of the data, the threat monitor being operative to generate an inquiry regarding the suspect entity; and (b) a knowledge module including a database and a reasoner, the database being operative to archive the data from the sensor network and provide the data to the reasoner, the reasoner being in communication with the threat monitor and the database, the reasoner being operative to analyze the data corresponding to the suspect entity in response to the inquiry generated by the threat monitor and to provide a threat status regarding the suspect entity.

The system may also include a processor. The processor may be operative to process the data prior to archival thereof in the database. The processed data may be classified according to at least one data representation level.

According to an additional implementation of the present invention, the reasoner may include a backtracking module that may be operative to create a data set of the data corresponding to the suspect entity. The data set may be utilized by the reasoner to evaluate the threat status.

In a nutshell, implementation of the present invention complements current forward-time-based tracking approaches with a backward-time-based approach, to track an entity—a vehicle or person—"backwards in time" and reason about its observed prior locations and behavior. The backward tracking process focuses on that subset of the data within the database that shows the entity of interest at successively earlier times.

Generally, there are at least two ways that backward-time tracking may be deployed. Before an entity is known to be a threat or not, an assessment is made on whether the entity is a potential threat based on suspicious prior behavior. This is important because early detection of threats allows them to be neutralized or the damage they inflict kept to a minimum. This mode of operation may be referred to as predictive mode.

Secondly, after an entity has been verified to be a threat, prior behavior may be analyzed to gain useful information, such as other entities associated with the threat or modus operandi of the adversary. This mode of operation may be referred to as forensic mode.

Predictive mode may begin backward tracking when an entity indicates the intent to engage a friendly force or sensitive asset, usually by approaching it, but with no overtly threatening activity. The resulting sequence of historical frames showing that entity may be analyzed to assess its past behavior and compare it against threat behavior templates to assess whether it might be a threat. For example, in the case of a vehicle approaching the friendly force, the following examples of past behavior would provide evidence that the vehicle may be a threat: (a) the vehicle came from a suspected hostile site; (b) the vehicle was stolen; (c) some transfer of bulky material was made to the vehicle; (d) the vehicle driving pattern was erratic; (e) the vehicle came from a suspicious meeting; and/or (f) the vehicle engaged in frequent recent drive-bys.

Predictive mode may require that a site database be developed and maintained in order to provide the site classifications of different urban locations so that, for example, it is possible to tell if the entity has come from or visited a known or suspected hostile site.

Forensic mode may begin backward tracking after an entity engages in overtly threatening activity and the system or a user consequently instigates an investigation. The results of backward tracking may be used to: (a) identify a potentially hostile site, including learning the locations of weapon stashes and infiltration routes that would result in a modification to the site database used by the predictive mode; (b) identify other players in the opposition, and perhaps the political responsibility behind an attack; (c) deduce information from patterns, for example, by using a process of elimination a sniper may be identified after analysis of several attacks provides some thread of commonality; and/or (d) learn enemy tactics and operational procedures, which information may then be adapted for use by the predictive mode.

Implementations of the present invention may allow the urban terrain to be viewed as a historical sequence of time-varying snapshots. By allowing suspect entities to be tracked both backwards and forwards within this time sequence, the standard forward-time track approach is enhanced to identify relevant behaviors, urban sites of interest, and may further aid in threat prediction and localization. Thus, implementations of the present invention may provide significant benefits beyond those supplied by current state of the art approaches.

Smart utilization of computational resources is also critical to implementations of the present invention. Although a few entities, such as suspect entities, those associated therewith, other individuals, or high-value sites may be actively monitored, the bulk of the data may be archived so that it can be processed if and when it is needed in the course of investigation. Thus, resource utilization is reduced and system resources may be effectively allocated. The internal goal may include optimally managing the system's resources in order to concentrate them on potentially important events and entities, while its exterior goal may include keeping the user informed.

According to further implementations of the present invention, the system may be extended to reason about buildings and other objects in addition to vehicles and persons. Buildings may be threat candidates because they may be booby-trapped, set up for an ambush, or provide bases of operation to hostiles. Historical sensor feeds may be analyzed to evaluate suspicious sequences of past activity occurring in the vicinity of a building. For example, if a building is discovered to be booby-trapped, a search for recent visitors to the building may identify a vehicle that stopped and delivered a package to the building. That vehicle could then be tracked backward and forward through the historical sensor feed to identify other buildings it also visited, and tracking up to the current time would provide its current location. If other buildings were visited and turn out to be similarly booby-trapped, then the vehicle/driver may be confirmed as a threat. Otherwise, it would be considered a plausible threat and actively tracked and/or interrogated.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Figure 1:
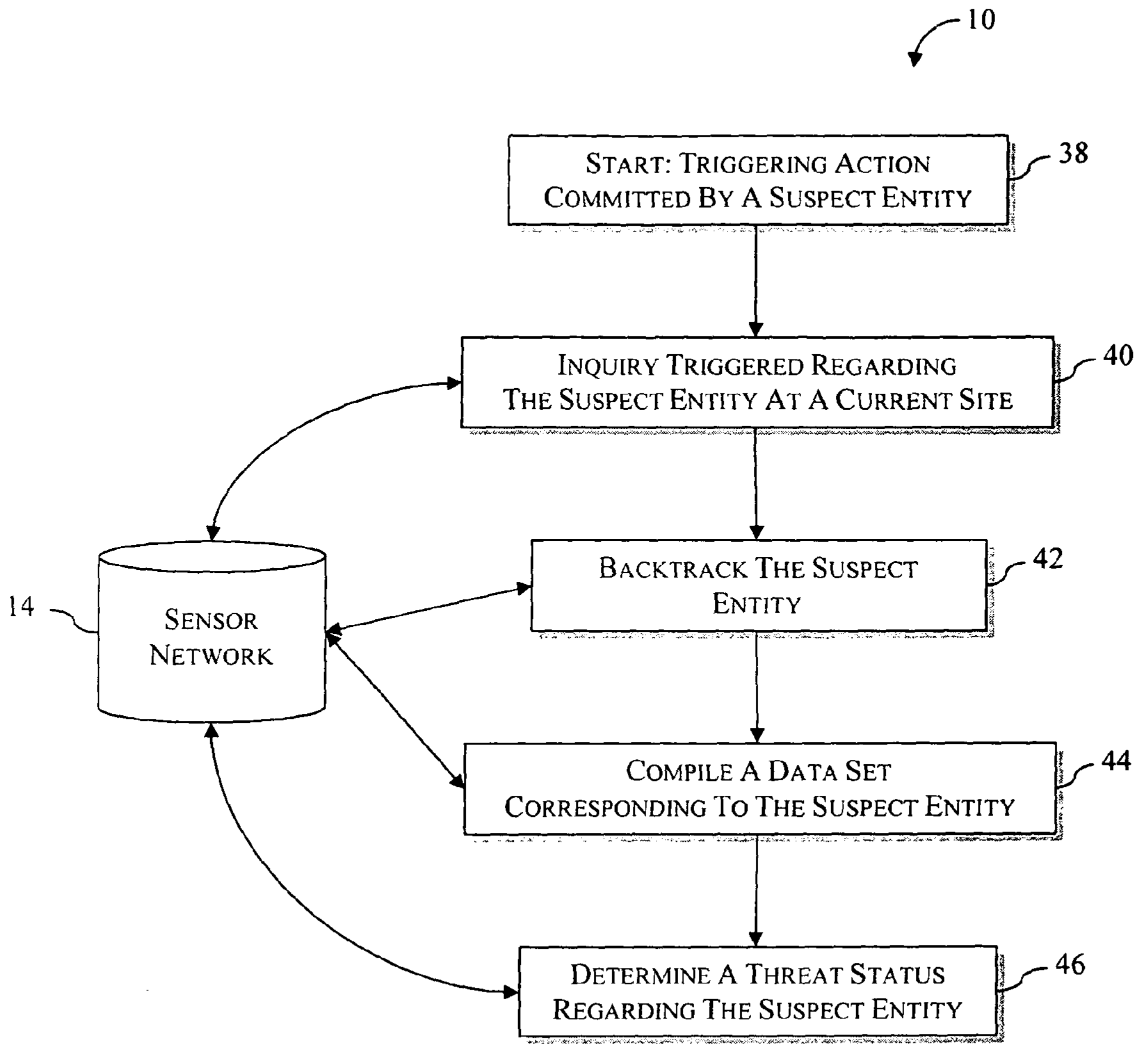
FIG. 1 is a block diagram of a method of threat detection in accordance with an embodiment of the present invention.

Referring now to the drawings wherein the showings are for purposes of illustrating a preferred embodiment of the present invention only and not for purposes of limiting the same, FIG. 1 is a block diagram view of a method 10 of threat detection which utilizes data collected via a system 12 including a ubiquitous sensor network 14 spread over a plurality of sites in an urban environment. The urban environment may be any given city or location within a city such as a shopping mall, airport, or military installation which implements security measures. The sensor network 14 utilized in conjunction with various embodiments of the present invention may consist of a plurality of sensor mechanisms such as video cameras, thermal imaging devices, infrared imaging devices, and other sensors known in the art. At least one of the sensors may be installed at a given site in the urban environment. The specific geographic and physical configuration of the sensor network 14 may be determined according to objectives of the system, security considerations, and other factors relevant to the implementation of the system. In particular, it is contemplated that in order to enhance efficiency and effectiveness of the system, the sensor network 14 should be distributed such that an entity traveling in the urban environment may be detected at all times by at least one of the sensors at a given site of the sensor network 14.

Figure 2:
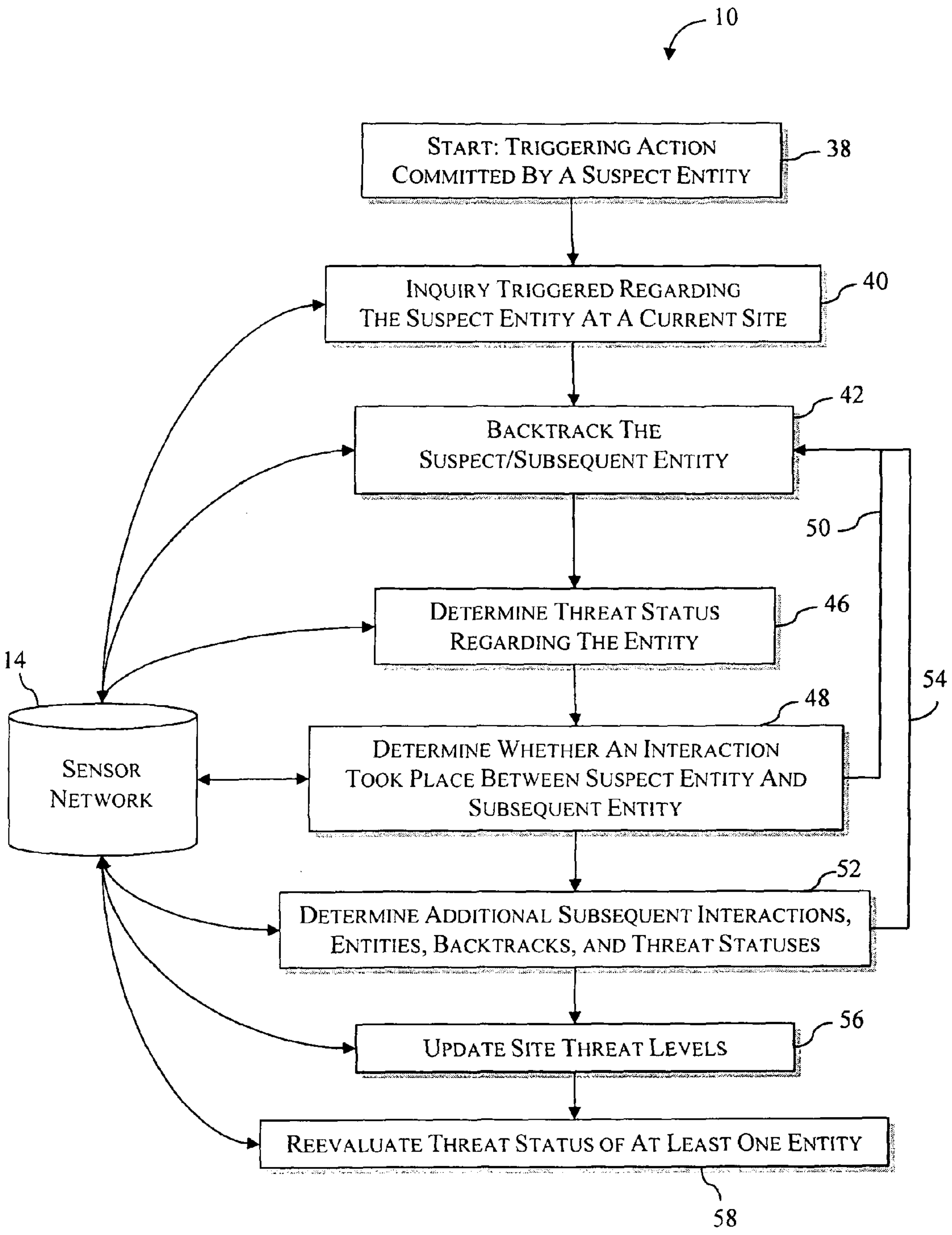
FIG. 2 is a block diagram of a method of threat detection in accordance with another embodiment of the present invention.

According to an aspect of the present invention, the system 12 and method 10 of predictive threat detection is operative to reanalyze and reinterpret the data collected from the sensor network 14 in response to current findings from the sensor network 14. As shown in FIG. 2, another embodiment of the method 10 may include various steps to determine a threat status for various entities. Therefore, the sensor network 14 may utilize archived data collected from the sensor network 14 to provide a more complete understanding regarding an entity's origin, purpose, route of travel, and/or other information that may be useful to assess whether or not the entity should be considered a threat to security. In addition, the system 12 may allocate additional system resources in response to the discovery of a suspicious entity.

Figure 3:
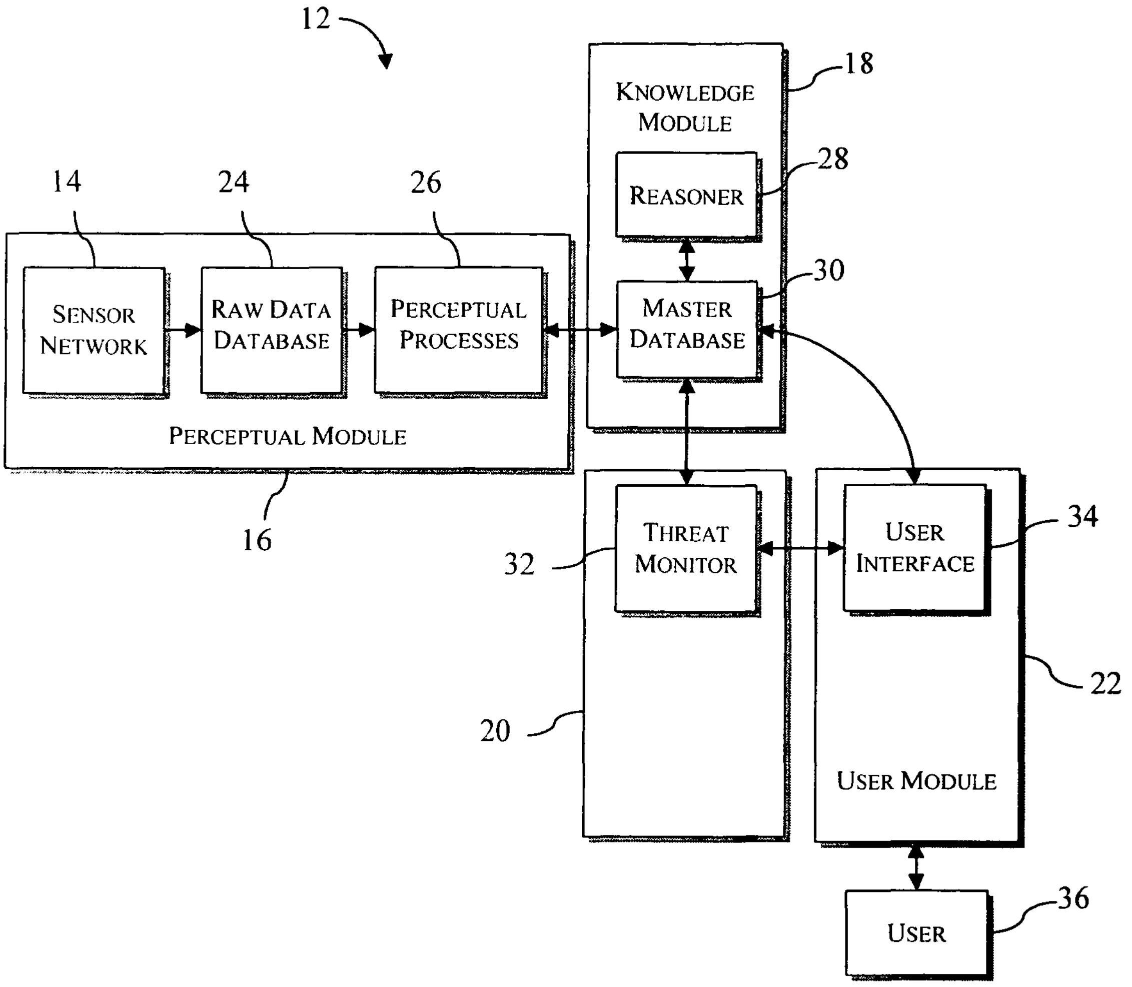
FIG. 3 is a block diagram of a system of threat detection in accordance with another embodiment of the present invention.

As disclosed herein, the methods and systems can detect, track, and classify moving entities in video sequences. Such entities may include vehicles, people, groups of people, and/or animals. Referring now to FIG. 3, the system 12 may include a perceptual module 16, a knowledge module 18, an autonomous module 20, and a user module 22. According to an exemplary embodiment of the present invention, the perceptual module 16 may include the sensor network 14 and may be spatially separate from the knowledge module 18, the autonomous module 20, and the user module 22. The perceptual module 16 may also include a raw data database 24 and may be operative to perform perceptual processes 26. As also shown in FIG. 3, the knowledge module 18 may include a reasoner 28 and a master database 30.

The reasoner 28 may allow the system to reason about and make new inferences from data already in the master database 30 as well as make requests for new information or re-analysis from the perceptual module.

The autonomous module 20 may include a threat monitor 32. The autonomous module 20 may allow the system 12 to function automatically, which may require little or no human interaction. Thus, the backtracking, classification, and threat detection methods and systems disclosed herein may be automatically performed and utilized. The threat monitor 32 may allow the user to instruct the system 12 to autonomously monitor the master database 30 for data which may be of interest to the user 36. The threat monitor 32 may additionally allow the user 36 to instruct the system 12 what actions to take if such data is found, especially autonomous courses of action to be taken in the absence of user intervention.

Further, the user module 22 may be accessed by a user 36 of the system. The sensor network 14 may include video cameras operative to collect the data from the urban environment at each of the sites. The video cameras may obtain the data from each site at a rate corresponding to a site threat level. Thus, the data may include video images obtained from the video cameras. Additionally however, the data may also include sound recordings obtained through other sensors. It is contemplated that at a given site, the sensor network 14 may be configured to include both audio and visual sensors such as cameras and recording devices, as well as other types of imaging, thermal, and data acquisition sensors. For example, the sensor network 14 may be modified to include various sensors, as mentioned above, at sites where security is maintained at high levels, such as at military installations and government facilities.

According to a preferred embodiment of the present invention, the method 10 is initialized upon the starting step, i.e., trigger step 38. The method 10 comprises the steps of: (a) triggering an inquiry regarding a suspect entity at a current site in response to commission of a triggering action by the suspect entity (i.e. inquiry step 40); (b) backtracking the suspect entity in response to the inquiry by collecting the data from each site at which the suspect entity was detected by the sensor network 14 (i.e. backtrack step 42); (c) compiling a data set including a list of the sites at which the suspect entity was detected and the data corresponding thereto (i.e. compile step 44); and (d) comparing the list of sites included within the data set to the corresponding site threat level to determine a threat status regarding the suspect entity (i.e. compare step 46).

The triggering step may include detecting events such as entering a facility, approaching a security gate, and certain behavioral patterns, all of which are provided for illustration of triggering actions, and not limitation thereof.

As discussed above, in contrast to a forward-time-based tracking approach, embodiments of the present invention utilize a backward-time-based approach to track the entity "backwards in time" and reason about its observed prior locations and behavior. For example, if an entity commits the triggering action at the current site. (trigger step 38), the entity may be deemed a "suspect entity," and the inquiry regarding the suspect entity may begin (inquiry step 40). The backtracking step 42 may include obtaining the data collected regarding the suspect entity, beginning at the current site, and proceeds backwards in time. The data corresponding to the suspect entity may be accessed from the knowledge module 18 whereat the data was stored. In order to compile the data set (compile step 44), the system 12 may analyze the data from each site located adjacent to the current site to track the suspicious entity. As mentioned above, and as known in the art, the sensor network 14 may facilitate this process through classification and identification of the suspect entity as it moves from site to site within the sensor network 14. In this regard, the backwards tracking of the suspect entity may be performed by the system 12 utilizing the object classification of the suspect entity as detected by the sensor network 14. Upon completion of the data set, it is contemplated that the data set may include the list of sites at which the suspect entity was detected. The list of sites may then be utilized to determine further information regarding the suspect entity. For example, the list of sites may be compared (compare step 46) to the corresponding site threat level of each site to determine the threat status of the suspect entity. In addition, the data set may include other video, data images, sound recordings, and other forms of data collected via the sensor network 14 which may be utilized to further determine the threat level of the suspect entity. Therefore, the data set may include a sequence of historical frames showing the suspect entity from site to site. This information may be analyzed to assess the suspect entity's past behavior and compare it against threat behavior templates to assess whether the suspect entity might be a threat to security.

For example, in the case of a vehicle approaching a security gate, the following examples of past behavior may provide evidence that the vehicle may be a threat: the vehicle came from a suspected hostile site; the vehicle was stolen; some transfer of bulky material was made to the vehicle; the vehicle driving pattern was erratic; the vehicle came from a suspicious meeting; or the vehicle engaged in frequent recent drive-bys. Assessment of the data set therefore allows the system 12 to engage in a predictive threat detection mode. Thus, the sensor network 14 may continually update the knowledge module 18 regarding new data and may further provide updated classifications of the site threat level of each site within the urban environment. Thus, the urban environment may be monitored and the suspect entity may be properly identified corresponding to its threat level.

According to another implementation the method 10 may further include the steps of: analyzing the data within the data set of the suspect entity to determine whether an interaction took place between the suspect entity and a subsequent entity (i.e. interaction step 48); and upon determining that the interaction took place, automatically repeating the backtracking, compiling and comparing steps for the subsequent entity to determine a threat status regarding the subsequent entity (i.e. repeat step 50). The backtracking of the suspect entity, as mentioned above, provides the data set of sites and data related to the suspect entity. This data may be further analyzed to determine whether the suspect entity engaged in any interactions with other entities, and what the outcome or implication of such interactions may be.

In accordance with an embodiment of the present invention, the interaction may be a physical transfer, a mental transfer, and/or a physical movement. Thus, if the suspect entity is seen in a frame of video data positioned adjacent to the subsequent entity for a prolonged period of time, the system 12 may infer that a mental transfer took place. The mental transfer may include a mere conversation or exchange of information. If the video data reveals that the suspect entity received or transferred another object to or from the subsequent entity, this physical transfer may also be interpreted by the system. Thus, in an implementation of the present invention, such video data showing the physical transfer and/or the mental transfer may be provided in the data set for further interpretation by the system. In obtaining this data, the system 12 may identify the subsequent entity and track the subsequent entity backwards in time to determine whether the physical and/or mental transfer should affect the threat level of the suspect entity or the subsequent entity. For example, if backwards tracking of the subsequent entity reveals that the subsequent entity came from a hostile site, any physical transfer or mental transfer to the suspect entity may affect the threat level of the suspect entity.

In addition, upon determination that the suspect entity interacted with the subsequent entity and that the subsequent entity originated or is otherwise connected to a hostile site, the data within the data set of the suspect entity may be updated accordingly. For example, any site classification of the sites at which the suspect entity was detected may be updated to reflect an increased threat level of the suspect entity. Correspondingly, any physical or mental transfer by the suspect entity that took place after a physical or mental transfer with the subsequent entity may also be viewed as having an increased threat level. As may be understood by one of skill in the art, various other inferences and scenarios are contemplated as being within the scope of implementations of the present invention.

According to another aspect of the present invention, the method 10 may further include the steps of analyzing the data within the data set of the subsequent entity to determine whether an interaction took place between the subsequent entity and an additional subsequent entity (i.e. determine step 50); and upon determining that the interaction took place, automatically repeating the backtracking, compiling, and comparing steps for the additional subsequent entity to determine a threat status regarding the additional subsequent entity (i.e. determine step 50). The determine step 50 may include repeating steps 40, 42, and 44 for each additional subsequent entity, and other entities identified through the performance of these steps. Therefore, the system 12 may be accordingly modified to incorporate an ontological analysis of entities as they correspond with one another. Through this ontological approach, it is contemplated that each and every entity may be backtracked as the system 12 is triggered through various interactions. New data compiled in the respective data sets for each of the respective entities may be analyzed in order to assess the threat status of each entity. Additionally, the data therein may also be utilized to update the site threat level of respective sites whereat the entities were detected or whereat physical transfers, mental transfers and/or physical movements took place (i.e. update step 56).

In accordance with yet another embodiment of the present invention, the method 10 may further include the step of reevaluating the threat status of at least one entity in response to at least one of: the threat status of the additional subsequent entity and the data set for the additional subsequent entity (i.e. reevaluate threat status step 58). The method 10 may include the step of reevaluating the threat status of the suspect entity in response to at least one of: the threat status of the subsequent entity and the data set for the subsequent entity. In this regard, the method 10 may include the step of reevaluating the threat status of a given entity in response to at least one of: the threat status of another given entity and the data set for another given entity. Further, the method 10 may also include the steps of: reanalyzing the data corresponding to the interaction to determine additional information regarding at least one of: the physical transfer, the mental transfer, and the physical movement; and reevaluating the threat status of at least one entity based on the additional information.

As a further aspect of the present invention, upon collection of the data by the sensor network 14, the data may be stored initially in the raw data database 24 and processed utilizing at least one of various techniques known in the art. This processing may take place in the perceptual module 16 utilizing perceptual processes 26. Such perceptual processes 26 and techniques may include background subtraction and temporal differencing, resolving between multiple overlapping objects, classification of objects, tracking of objects, analyses of objects, and pattern matching. Thus, the sensors of the sensors network may be configured to process the data obtained from each site in order to index or archive the data in the knowledge module 18 with greater facility. It is contemplated that the availability of mass storage and processing power may continue to grow in the future, as will the complexity and ability of individual sensors.

Thus, as better, more powerful processors are developed, the data obtained through the sensor network may be analyzed faster and with less burden on system resources. This trend of increasing processor power causes a growing set of algorithms that may be applied to all data as it is collected. However, there will always be more complex algorithms that would overwhelm system resources if applied to all data. Such resource-intensive algorithms may be developed to address increasingly sophisticated countermeasures used by opponents. The use of these more effective but more computationally expensive data processing methods is deferred by the system 12 until their use is warranted, in which case the processing is done retroactively. Without this deferral capability, image analysis is limited to those methods that can be executed on all objects in real time. In this regard, it is contemplated that the system 12 may re-analyze historical sensor data in light of a discovery by the system 12 that warrants a closer look or reinterpretation. This allows the system 12 to utilize detection methods that may require resources beyond what is feasible to use for all objects in those cases where such a method is realized to be beneficial.

Given the current state of the art, continuous updating and acquisition of data through a ubiquitous sensor network 14 requires tremendous data storage and data processing ability. In order to facilitate this process, the data may therefore be simplified, compressed, or otherwise modified in order to reduce the burden of such storage and processing on the system. In this regard, it is contemplated that the processing of the data via classification, tracking, analysis, and other methods utilizing the perceptual module 16 may provide for faster backtracking, updating, and other system 12 functionality. In this regard, it is contemplated that the data may be stored in the master database 30 of the knowledge module 18 for a specific time span. The master database 30 may store the data after the data has been processed by the perceptual module 16. The time span may correspond to various factors such as the site threat level of the site from which the data was acquired, available system resources, and the like.

Figure 4:
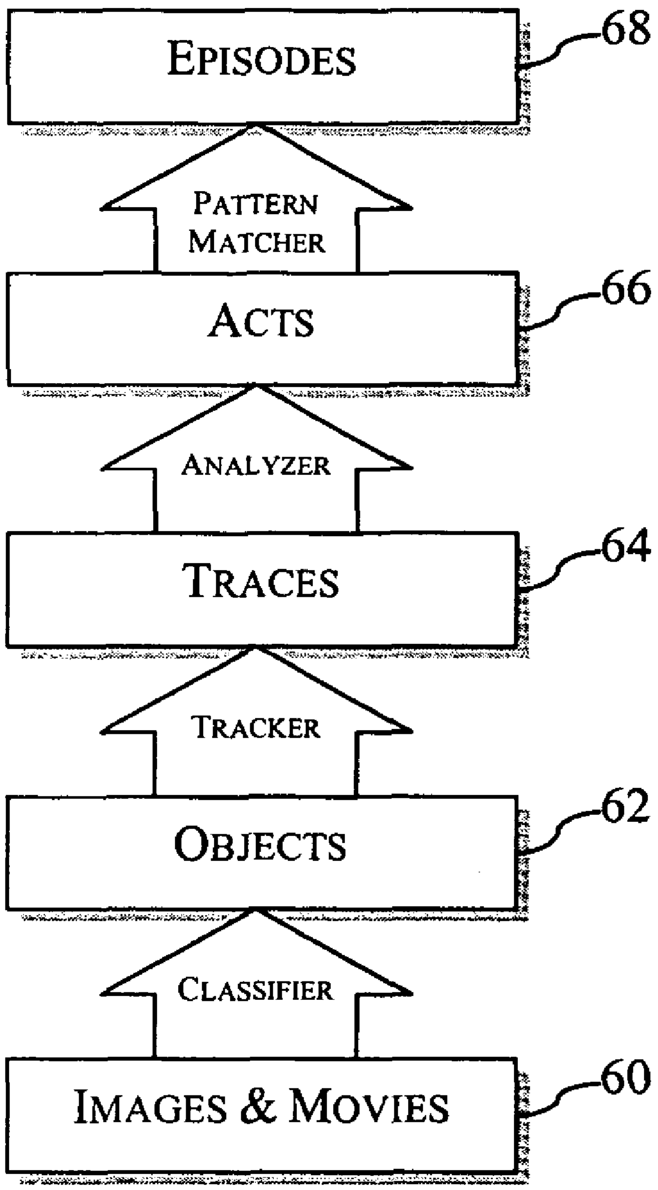
FIG. 4 is a block diagram of data representation levels in accordance with another embodiment of the present invention.

Thus, according to an embodiment of the present invention, the system 12 performs image capture analysis, and exploitation of the data from the sensor network 14 in the urban environment where a large number, perhaps hundreds or thousands, of cameras and other fixed sensors provide copious data streams. The data collected through the sensor network 14 may be stored as a raw data stream for a significant period of time, e.g., hours or days. In processing the data, the system 12 may process and store the data according to various data representation levels. As shown in FIG. 4, the data representation levels may include images and movies 60, objects 62, traces 64, acts 66, and/or episodes 68. Each of the data representation levels may be present within the knowledge module 18. However, it is contemplated that the data set for a given entity may include a single or multiple data representation levels as required by the system.

As disclosed herein, the images and movies 60 may include the raw data stream collected by the sensor network 14 plus results of any processing done when the data is first collected. The image and movies 60 data representation level may include a simple time sequence of images from related sensors and may be the least informed and most uninteresting collection of the data in the system. As may be understood, the images and movies 60 data representation level may also be by far the largest, and compression techniques to effectively store the data may be used. It is contemplated that in order to enhance the efficiency and success of the system 12 during backtracking, the image and movies 60 data representation level may not be processed.

However, in order to minimize the amount of computational effort required for object extraction and backward tracking, as much processing as possible may be applied to the data upon acquisition utilizing the perceptual module 16.

As mentioned above, the processing techniques may include: moving object detection, edge detection or other techniques to resolve between multiple overlapping objects; and simple classification of moving objects. In this regard, it is contemplated that the sensor network 14 may be configured to include a dedicated processor for each sensor or a small group of sensors in order to perform this initial processing. The amount of real-time image processing done as the data is collected, may be controlled by the amount of resources available to the system 12 and that, in turn, may be situation dependent. Situation-dependent processing of the data may be done in response to triggering events, entities, transactions, and other stimuli. In addition, as situations arise, system resources may be allocated to accommodate high priority processing of the data, which priorities may be determined by the type of triggering event that took place.

According to another aspect of the present invention, the data may be classifiable as objects 62 in accordance with the data representation level. Objects 62 may include entities in the environment such as people, vehicles, building and other objects that can be carried. As mentioned above, video image data may be analyzed by a classifier in order to identify and label objects 62 within the data. The classifier, as its name implies, may attempt to label each object 62 with its category, e.g., a vehicle, or if more information is available, an automobile. In this regard, the classifier may attempt to convey the most specific label to each object 62 as is supported by the data. However, the classifier may be prohibited from guessing because categorical mistakes of objects 62 may undermine the effectiveness of the system.

In an exemplary embodiment, objects 62 may be broken down into two categories: static and mobile. A static object 62 such as a building or telephone booth may always be part of the image formed by a particular stationary sensor. When a stationary sensor is placed, the data image may be reviewed and correct classifications of static objects 62 may be provided, such as classifying a building as a store, which classification may not otherwise be derived from the image. Mobile objects 62 may be vehicles, people, apple carts, and like. Such mobile objects 62 may move within an individual sensor's field of regard or may even cross sensor boundaries. As is known in the art, the sensor network 14 may utilize camera-to-camera hand off utilizing multiple camera scenarios. Thus, a moving object 62 may be tagged and tracked throughout the sensor network 14 as discussed previously. Thus, each of the static and mobile objects 62 may be classified and tagged as accurately as possible. In this regard, the classification or tag of the object 62 may include other information such as whether the object 62 is friendly or suspicious. Thus, a person or vehicle may be labeled as friendly or suspicious. A parking lot and an office building may also have a property such as "stopover" that indicates that the frequent arrival and departure of one time short term visitors as opposed to residences is an expected part of their function. These types of properties may be inferred by the system 12 or provided by its human users. The specificity of the object's properties can change as the system 12 allocates additional resources to the processing of the object. It is even possible that a property may completely flip flop. For example, a neutral object 62 might become suspicious then later be identified as a friendly force. This autonomous property modification ability of the system 12 allows the system 12 to track entities and other objects 62 through the sensor network and accordingly update the classifications thereof in order to provide accurate predictive detection.

Referring still to FIG. 4, the trace 64 data representation level may include the temporal organization of the data collected from various sensors in order to determine whether an object 62 detected in the various sensors is in fact the same object. The trace 64 may be determined on the object 62 selectively by the system, thereby allocating additional system resources in order to effectuate the trace 64 of the object 62. Such tracing may allow the system 12 to determine properties of the object 62. For example, if velocity is noted to be above 20 miles per hour, the system 12 may conclude that the object 62 is motorized or propelled. Other various modifications and implementations of the trace 64 may be performed according to system 12 requirements.

The acts 66 data representation level shown in FIG. 4 may include the physical transfer, mental transfer, and/or physical movement mentioned previously. Thus, an act may be an association or relation among objects 62 and traces 64. It is contemplated that an act may or may not be asserted with certainty due to sensor and data processing limitations. However, it is contemplated that the act may be inferred by the system, and that the data may be interpreted by the reasoner 28 in conformity with an act, such as a mental transfer, a physical transfer, and/or a physical movement. Other acts 66 may include "enter" or "exit" that may associate a mobile object 62 with a static object 62 such as a building, military facility, or a shopping center. Thus, in tracking the object 62, the system 12 may recognize that the entity entered or exited a building. As mentioned above, as data processing and data classification techniques improve, it is contemplated that acts 66 may be asserted with a greater degree of certainty, thus allowing the system 12 to more accurately interpret and analyze the movement and behavior of an entity. Such improvements in technology may include artificial intelligence and facial recognition, just to name a few.

The episode 68 data representation level as shown in FIG. 4, may represent an aggregation of objects 62 and acts 66 that satisfy a predefined pattern of relations among the objects 62 and acts 66 incorporated into the episode 68, such as a behavioral pattern. These relations can be temporal or spatial and may require that particular roles of multiple acts 66 be identical. Episodes 68 may be utilized to indicate when system resources should be allocated, such as in order to start an inquiry into the suspect entity at the current site, as discussed above. For example, as an entity approaches a security gate, the episode 68 data representation level may allow the system 12 to trigger the inquiry and initiate backtracking of the entity.

Figure 5A:
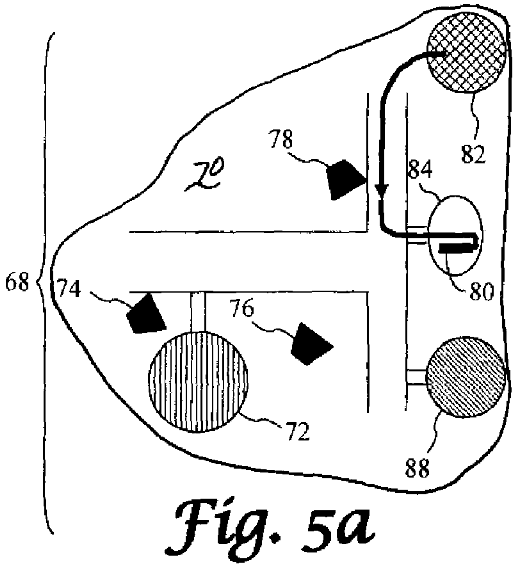
FIGS. 5*a*-5*d* illustrate an aspect of the system and method in accordance with another embodiment of the present invention.
Figure 5B:
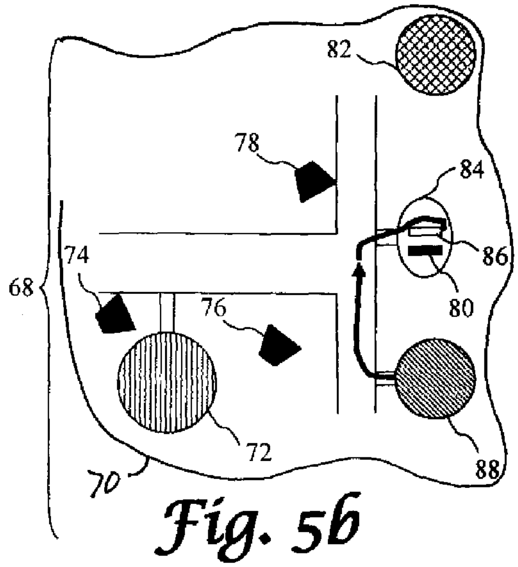
Figure 5C:
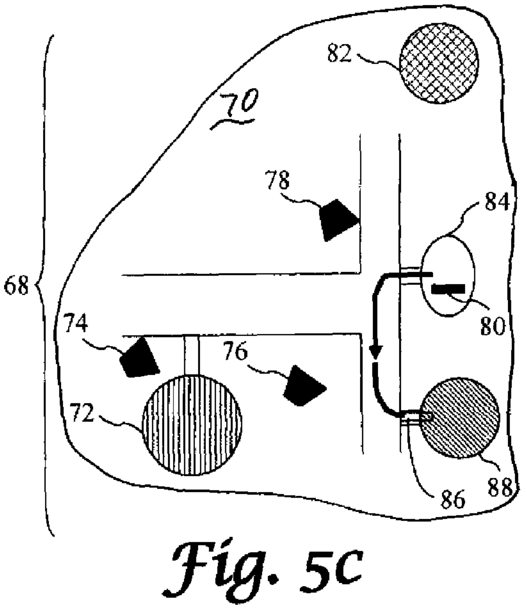
Figure 5D:
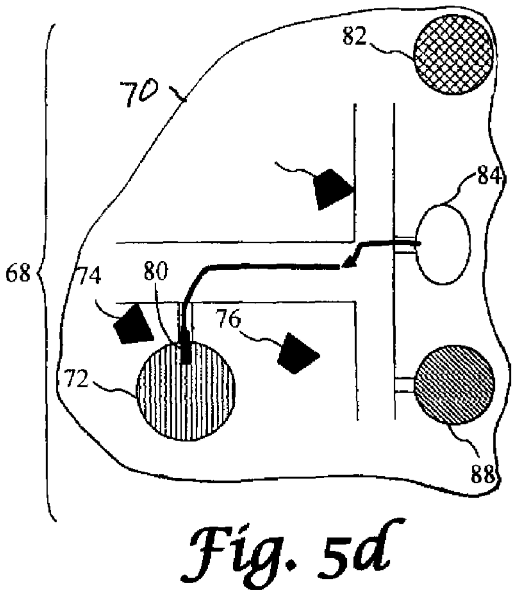
Figure 6:
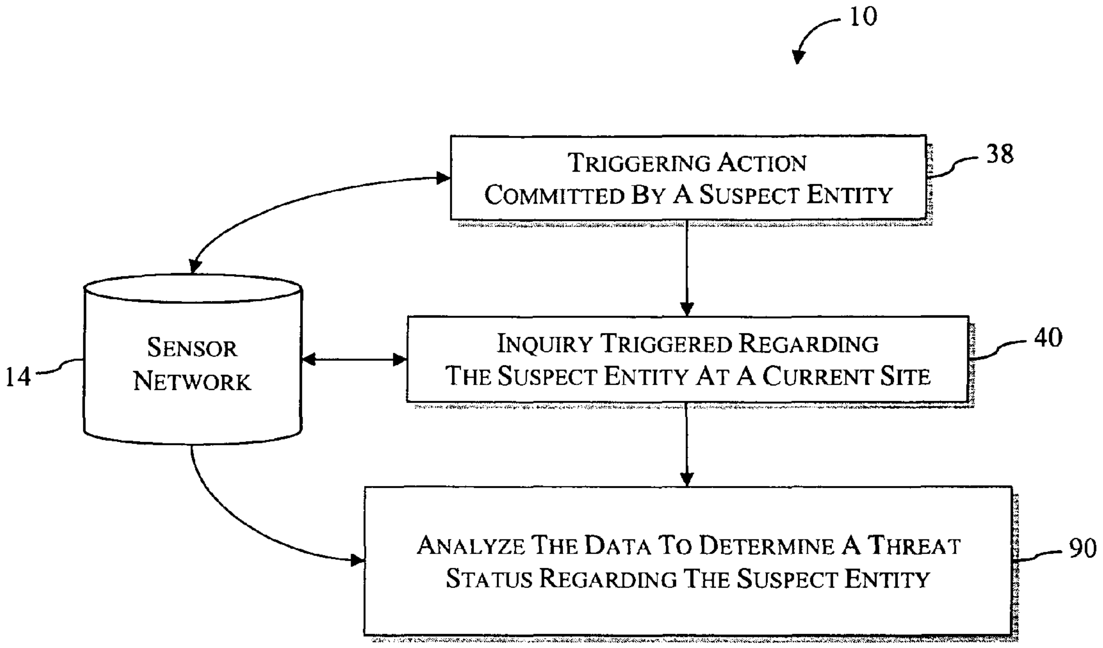
FIG. 6 is a block diagram of a method of threat detection in accordance with another embodiment of the present invention.

Thus, utilizing the above-mentioned data representation levels, the system 12 may analyze and interpret interactions between entities within the urban environment. Referring now to FIG. 5*a*-5*d*, an example is provided. In the following example, the urban environment may include a small urban area 70 surrounding a friendly military base 72. The sensor network 14 may consist of three sensors, one which monitors base entry (sensor A 74), another monitoring the road north of the base entrance (sensor B 76), and another monitoring the road south of the base entrance (sensor C 78). The system 12 may be instructed to backtrack all vehicles arriving at the base, tracing back through the vehicle's data set for any interactions. According to the example, as shown in FIG. 5*a*, a first vehicle 80 leaves an origin site 82 and arrives at a parking lot 84 to await a second vehicle 86, as recorded by sensor B 76. In FIG. 5*b*, the second vehicle 86 leaves a known hostile site 88 and arrives at the parking lot 84, as recorded by sensors B and C. The first and second vehicles 80, 86 are involved in a suspicious meeting in the parking lot 84, as recorded by sensor B 76. In FIG. 5*c*, after the meeting, the second vehicle 86 leaves the parking lot 84 and arrives at the hostile site 88. In FIG. 5*d*, the first vehicle 80 leaves the parking lot 84 and attempts to enter the base at a later time.

Upon approaching the gate of the base, the system 12 initiates an inquiry and begins a backtracking sequence for the first vehicle 80. The backtracking traces the first vehicle 80 back to the suspicious meeting in the parking lot 84. The system 12 may also trace the first vehicle 80 back to the origin site 82, which may or may not have the site threat level as being hostile or friendly. At this time, the first vehicle 80 may be assigned a respective threat status. However, the system 12 may also recognize that the first vehicle 80 engaged in an interaction with the second vehicle 86. Depending on the data available to the system, the system 12 may identify the interaction as one of many acts 66. Additionally, the system 12 may also initiate a backtrack for the second vehicle 86 and provide any data and a list of sites corresponding to the second vehicle 86. The system 12 may then likely discover that the second vehicle 86 came from the hostile site 88, and may then assign it a corresponding threat status. Additionally, the system 12 may update the threat status of the first vehicle 80 in response to the threat status or data set of the second vehicle 86. Finally, the system 12 may update the site threat level of the origin site 82 in response, as least, to the threat status of the first and second vehicles 80, 86. Thus, as described herein, the system 12 may utilize the data corresponding to each of the vehicles and any other vehicles or entities identified in the backtracking of the first and second vehicles 80, 86 in order to assess the threat status of the first vehicle 80 and the site threat level of the origin site 82.

In accordance with another embodiment of the present invention, it is contemplated that the system 12 may further be operative to identify behavioral patterns through analysis of the data corresponding to a given entity. In this regard, a method 10 of predictive detection utilizing data collected via a ubiquitous sensor network 14 spread over a plurality of sites in an urban environment may be initialized upon the starting step, i.e., trigger step 38. The method 10 may comprise the steps of: a) triggering an inquiry regarding a suspect entity at a current site in response to commission of a triggering action by the suspect entity (i.e. inquiry step 40); b) in response to the inquiry, compiling the data corresponding to the site at which the suspect entity was detected by the sensor network 14 (i.e. compile step 44); and c) analyzing the data to determine a threat status regarding the suspect entity (i.e. analyze data step 90). The analyze data step 90 may include analyzing the data in a behavioral analysis in connection with the methods disclosed herein.

The data corresponding to a given entity may be utilized to determine the threat status of that entity. As mentioned above, certain locations and behavioral types may be monitored in order to predict threat status of the entity. The method 10 may further include the steps of analyzing the data to determine an interaction took place between the suspect entity and a subsequent entity (interaction step 48); and upon determining the interaction took place, automatically repeating the compiling and analyzing steps for the subsequent entity to determine a threat status regarding the subsequent entity (repeat step 50). Additionally, the method 10 may further include the step of reevaluating the threat status of the suspect entity in response to at least one of: the threat status of the subsequent entity and the data corresponding to the subsequent entity (reevaluate threat status step 58).

For each subsequent entity, the method 10 may further include the step of analyzing the data of the subsequent entity in order to determine whether an interaction took place between the subsequent entity and an additional subsequent entity (additional repeat step 54); and upon determining that the interaction took place, automatically repeating the compiling and analyzing steps for the additional subsequent entity to determine a threat status regarding the additional subsequent entity (additional repeat step 54). Further, the method 10 may also include the step of reevaluating the threat status of at least one entity in response to at least one of: the threat status of the additional subsequent entity and the data corresponding to the additional subsequent entity (reevaluate threat status step 58).

According to another aspect of the present invention, which may be utilized in connection with the analyze data step 90, the user 36 may access the data obtained through the sensor network 14 and initialize processing of the data according to user requirements. For example, the user 36 may review, correct, and/or enhance the initial detection, classification, and properties specifications of static objects 62 in the sensors field of regard. Additionally, in establishing monitor placement, the user 36 may specify what location should be monitored and for what types of activities. The user 36 may determine what information is requested and received by the system 12. For example, the user 36 may receive presentations of data collected by the sensor network 14 in order to prepare a presentation of the data. In this preparation, the user 36 may request the data at various data representation levels according to the user's requirements. The user 36, while reviewing the data, can guide the system 12 and cause it to re-label the data, choose particular objects 62 or activities to be further analyzed, or request lower priorities on ongoing activities in order to allocate additional system resources to the processing of the data required by the user 36.

As described above, embodiments of the present invention provide for a system 12 and method 10 of predictive threat detection in which sites, interactions, and behavioral patterns of an entity may be back tracked and interpreted and analyzed in response to current findings in order to determine a threat status of the entity. In addition to the predictive analysis of the data, it is contemplated that additional embodiments of the present invention may be utilized in a forensic mode. In this regard, it is contemplated that the data in all forms of data representation levels may be utilized by the system 12 in order to reevaluate the threat status of an entity or the site threat level of any given site within the sensor network 14. For example, in the scenario depicted in FIGS. 5*a*-5*d*, any of the data obtained through backtracking, analysis, and interpretation of the data sets corresponding to the first and second vehicles 80, 86 may also be utilized to update the site threat level of any of the given sites at which the first and second vehicles 80, 86 may have been detected. Of course, in real-world situations, where there are multiple interactions and multiple sites, the updating and backtracking may be quite complex. The system 12 may be able to detect other sites of interest in response to the behavioral patterns of entities. This mode of the system 12 may work interactively or separately from the predictive threat detection mode of the system. However, it is contemplated that information obtained through reanalysis and reinterpretation of the data corresponding to an entity may be used to modify object classifications, site threat levels, and other data representation levels.

Additionally, as mentioned previously, the system 12 may be configured to provide ontology-based modeling techniques to incorporate critical parameters, behaviors, constraints, and other properties as required by the system. For example, the system 12 may be configured to include component and user level interfaces through which inquiries to the system 12 may be made. For example, a user 36 may inquire of the system 12 to "identify agents that have interacted with pedestrian X." Thus, the system 12 may perform this inquiry and determine the appropriate data representation level for each of the "agent" and "pedestrian X" as well as the act 66 which is an "interaction." Through this ontology-based inquiry, a user 36 may access data relevant to various entities or investigations. This process may allow a user 36 to submit classifications of objects 62, configure the sensor network 14 classifications, modify site threat levels, and other various functionalities. In this regard, the accuracy and efficiency of the system 12 may be enhanced.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

What is claimed is:

1. A method of predictive threat detection utilizing data collected via a ubiquitous sensor network spread over a plurality of sites in an urban environment, the sites being classified according to site threat level, the method comprising:

a. triggering an inquiry regarding a suspect entity at a current site in response to commission of a triggering action by the suspect entity;

b. backtracking the suspect entity in response to the inquiry by collecting the data from each site at which the suspect entity was detected by the sensor network;

c. compiling a data set including a list of the sites at which the suspect entity was detected and the data corresponding thereto; and d. comparing the list of sites included within the data set to the corresponding site threat level to determine a threat status regarding the suspect entity;

e. analyzing the data within the data set of the suspect entity to determine whether an interaction took place between the suspect entity and a subsequent entity;

f. upon determining that the interaction took place between the suspect entity and the subsequent entity, automatically repeating the backtracking, compiling, and comparing steps for the subsequent entity to determine a threat status regarding the subsequent entity;

g. analyzing the data within the data set of the subsequent entity to determine whether an interaction took place between the subsequent entity and an additional subsequent entity; and h. upon determining that the interaction took place between the subsequent entity and the additional subsequent entity, automatically repeating the backtracking, compiling, and comparing steps for the additional subsequent entity to determine a threat status regarding the additional subsequent entity.

2. The method of claim 1 further including the step of: reevaluating the threat status of at least one entity in response to at least one of: the threat status of the additional subsequent entity and the data set for the additional subsequent entity.

3. The method of claim 1 wherein the interaction includes at least one of: a physical transfer, a mental transfer, and a physical movement.

4. The method of claim 2 further including the steps of:

a. reanalyzing the data corresponding to the interaction to determine additional information regarding at least one of: the physical transfer, the mental transfer, and the physical movement; and b. reevaluating the threat status of at least one entity based on the additional information.

5. The method of claim 1 wherein upon collection of the data by the sensor network, the data is initially processed utilizing at least one of: background subtraction and temporal differencing, resolving between multiple overlapping objects, classification of objects, tracking of objects, analysis of objects, and pattern matching.

6. The method of claim 5 wherein the processed data is used to derive one or more of: an image, a movie, an object, a trace, an act, and an episode.

7. The method of claim 1 wherein additional system resources are allocated to process the data in response to the inquiry regarding the suspect entity.

8. The method of claim 1 further including the step of: updating the site threat level of each of the respective sites at which the suspect entity was detected corresponding to the threat level of the suspect entity.

9. A method of predictive threat detection utilizing data collected via a ubiquitous sensor network spread over a plurality of sites in an urban environment, the method comprising:

a. triggering an inquiry regarding a suspect entity at a current site in response to commission of a triggering action by the suspect entity;

b. in response to the inquiry, compiling the data corresponding to the sites at which the suspect entity was detected by the sensor network; and c. analyzing the data to determine a threat status regarding the suspect entity;

d. analyzing the data to determine whether an interaction took place between the suspect entity and a subsequent entity;

e. upon determining that the interaction took place between the suspect entity and a subsequent entity, automatically repeating the compiling and analyzing steps for the subsequent entity to determine a threat status regarding the subsequent entity;

f. reevaluating the threat status of the suspect entity in response to at least one of: the threat status of the subsequent entity and the data set for the subsequent entity;

g. analyzing the data to determine whether an interaction took place between the subsequent entity and an additional subsequent entity; and h. upon determining that the interaction took place between the subsequent entity and the additional subsequent entity, automatically repeating the compiling and analyzing steps for the additional subsequent entity to determine a threat status regarding the additional subsequent entity.

10. The method of claim 9 further including the step of: reevaluating the threat status of at least one entity in response to at least one of: the threat status of the additional subsequent entity and the data set for the additional subsequent entity.

11. The method of claim 9 wherein the analyzing step further includes: identifying a behavior pattern of the entity based on the data.

12. The method of claim 11 wherein the threat status of the entity is reassessed based on the behavior pattern.

* * * * *